US011835131B2

(12) United States Patent
Ichikawa et al.

(10) Patent No.: US 11,835,131 B2
(45) Date of Patent: Dec. 5, 2023

(54) CONTROL APPARATUS FOR VEHICLE

(71) Applicants: TOYOTA JIDOSHA KABUSHIKI KAISHA, Toyota (JP); Aisin Corporation, Kariya (JP)

(72) Inventors: Masahide Ichikawa, Nagakute (JP); Kazumitsu Sugano, Toyota (JP); Shunsuke Yanagi, Kariya (JP); Yuji Imanaga, Kariya (JP); Yui Goto, Kariya (JP); Masatsugu Yoshimoto, Kariya (JP)

(73) Assignees: TOYOTA JIDOSHA KABUSHIKI KAISHA, Toyota (JP); Aisin Corporation, Kariya (JP)

( * ) Notice: Subject to any disclaimer, the term of this patent is extended or adjusted under 35 U.S.C. 154(b) by 0 days.

(21) Appl. No.: 18/158,123

(22) Filed: Jan. 23, 2023

(65) Prior Publication Data

US 2023/0235817 A1  Jul. 27, 2023

(30) Foreign Application Priority Data

Jan. 24, 2022 (JP) .................. 2022-008981

(51) Int. Cl.
*F16H 61/14* (2006.01)

(52) U.S. Cl.
CPC ..... *F16H 61/143* (2013.01); *F16H 2061/145* (2013.01)

(58) Field of Classification Search
CPC ... F16H 61/143; F16H 2061/145; F16D 48/06
See application file for complete search history.

(56) References Cited

U.S. PATENT DOCUMENTS

| 2006/0272914 | A1* | 12/2006 | Nakamura | F16H 61/143 192/3.29 |
| 2009/0055063 | A1* | 2/2009 | Nakamura | F16H 61/143 701/67 |
| 2010/0210412 | A1* | 8/2010 | Kojima | F16H 61/143 477/38 |
| 2010/0210416 | A1* | 8/2010 | Nishimine | F16H 61/0206 477/115 |

FOREIGN PATENT DOCUMENTS

| JP | 2012-172761 A | 9/2012 |
| JP | 2012-177434 A | 9/2012 |
| JP | 2013-087883 A | 5/2013 |

* cited by examiner

*Primary Examiner* — Edwin A Young
(74) *Attorney, Agent, or Firm* — Oblon, McClelland, Maier & Neustadt, L.L.P.

(57) ABSTRACT

A control apparatus for a vehicle provided with (i) a power source, (ii) drive wheels and (iii) a fluid transmission device disposed between the power source and the drive wheels and including a lockup clutch to which a fluid pressure is supplied. A feedback control is executed for correcting a command value of the fluid pressure by a correction amount such that an actual value of a slip amount of the lockup clutch becomes substantially equal to the target value of the slip amount in a slip control. When the actual value has been converged into a given range with respect to the target value, the correction amount is obtained, and the command value for a next execution of the slip control is corrected by learning with use of the obtained correction amount. The given range is set depending on the target value of the slip amount.

6 Claims, 5 Drawing Sheets

CONTROL APPARATUS FOR VEHICLE

This application claims priority from Japanese Patent Application No. 2022-008981 filed on Jan. 24, 2022, the disclosure of which is herein incorporated by reference in its entirety.

FIELD OF THE INVENTION

The present invention relates to a control apparatus for a vehicle that is provided with (i) a power source, (ii) drive wheels and (iii) a fluid transmission device which is disposed between the power source and the drive wheels and which includes a lockup clutch.

BACKGROUND OF THE INVENTION

There is well-known a control apparatus for a vehicle that is provided with (i) a power source, (ii) drive wheels and (iii) a fluid transmission device which is disposed in a power transmission path between the power source and the drive wheels and which includes a lockup clutch. An example of such a control apparatus is disclosed in JP 2012-177434 A. This Japanese Patent Application Publication teaches that, when the lockup clutch is switched from a released state to an engaged state, it is detected that a slip amount of the lockup clutch becomes smaller than a given value, and a value is obtained by subtracting a command pressure value from an estimated pressure value, wherein the command pressure value is a command value of a hydraulic pressure of the lockup clutch upon the detection, and the estimated pressure value is an estimated value of the hydraulic pressure of the lockup clutch upon the detection. Then, the command value of the hydraulic pressure upon start of release of the lockup clutch is corrected based on a learned correction value that is set by comparing the obtained value with a predetermined standard value.

SUMMARY OF THE INVENTION

By the way, a state in which the slip amount of the lockup clutch is smaller than the given value includes a state in which the slip amount of the lockup clutch is zero when the lockup clutch is placed into an engaged state due to an excessive increase of a hydraulic pressure of the lockup clutch. Therefore, the hydraulic pressure of the lockup clutch could not be appropriately corrected by learning. For example, in a slip control executed to correct a command value of the hydraulic pressure of the lockup clutch by a feedback control such that the slip amount of the lockup clutch becomes substantially equal to a target value, the command value of the hydraulic pressure of the lockup clutch, which is to be used in a next execution of the slip control, could be corrected by learning with use of a correction amount by which the command value of the hydraulic pressure is corrected by the feedback control when the slip amount of the lockup clutch is converged into a given range with respect to the target value. However, in this learning, where the given range includes zero, there is a case in which it is determined that the slip amount has been converged into the given range when the slip amount has become zero. In this case, actually, the lockup clutch has been placed into a fully engaged state, rather than that the slip control is stably performed. Therefore, if the correction amount upon determination that the slip amount has been converged into the given range were used in the next execution of the slip control, the hydraulic pressure of the lockup clutch is unlikely to be appropriately corrected by the learning.

The present invention was made in view of the background art described above. It is therefore an object of the present invention to provide a control apparatus for a vehicle, wherein the control apparatus is capable of appropriately correcting a command value of a fluid pressure supplied to a lockup clutch, by learning.

The object indicated above is achieved according to the following aspects of the present invention.

According to a first aspect of the invention, there is provided a control apparatus for a vehicle that is provided with (i) a power source, (ii) drive wheels and (iii) a fluid transmission device which is disposed in a power transmission path between the power source and the drive wheels and which includes a lockup clutch that is to be placed in a released state, a slipping state or an engaged state by a fluid pressure supplied to the lockup clutch. The control apparatus includes: a lockup-clutch control portion configured to execute a slip control for controlling the lockup clutch to place the lockup clutch into the slipping state, by setting a command value of the fluid pressure which establishes a target value of a slip amount that corresponds to a difference between an input rotational speed and an output rotational speed of the lockup clutch. The lockup-clutch control portion is configured, when executing the slip control, to execute a feedback control for correcting the command value of the fluid pressure supplied to the lockup clutch by a correction amount such that an actual value of the slip amount becomes substantially equal to the target value of the slip amount. The control apparatus further includes a learning control portion configured, when determining that the actual value has been converged into a given range with respect to the target value, to obtain the correction amount by which the command value of the fluid pressure has been corrected, and to correct the command value that is to be set for a next execution of the slip control, by learning with use of the obtained correction amount. The learning control portion is configured to set the given range, depending on the target value of the slip amount.

According to a second aspect of the invention, in the control apparatus according to the first aspect of the invention, the learning control portion is configured to set the given range such that the actual value of the slip amount is not in the given range when the actual value of the slip amount is zero.

According to a third aspect of the invention, in the control apparatus according to the second aspect of the invention, the slip amount is obtained by subtracting one of the input and output rotational speeds of the lockup clutch from the other of the input and output rotational speeds of the lockup clutch, wherein the learning control portion is configured to set the given range, such that the given range includes a positive-side region in which the slip amount is larger than the target value and a negative-side region in which the slip amount is smaller than the target value, and such that one of the positive-side region and the negative-side region is wider than the other of the positive-side region and the negative-side region.

According to a fourth aspect of the invention, in the control apparatus according to the third aspect of the invention, the learning control portion is configured to set the negative-side region narrower than the positive-side region when the target value of the slip amount is a positive value, and is configured to set the positive-side region narrower than the negative-side region when the target value of the slip amount is a negative value.

According to a fifth aspect of the invention, in the control apparatus according to any one of the first through fourth aspects of the invention, the learning control portion is configured to determine that the actual value of the slip amount has been converged into the given range, when a state in which the actual value is in the given range has lasted for at least a given time.

According to a sixth aspect of the invention, in the control apparatus according to any one of the first through fifth aspects of the invention, the given range is a predetermined threshold range, such that the learning control portion determines that the lockup clutch is controlled to be placed into a target slipping state that belongs to the slipping state, when determining that the actual value of the slip amount has been converged into the predetermined threshold range as the given range.

In the control apparatus according to the first aspect of the invention, when it is determined that the actual value has been converged into the given range with respect to the target value, the correction amount by which the command value of the fluid pressure has been corrected is obtained, and the command value that is to be set for a next execution of the slip control is corrected by learning with use of the obtained correction amount, wherein the given range is set depending on the target value of the slip amount. As compared with an arrangement in which the given range is set regardless of the target value of the slip amount, it is possible to more easily obtain the correction amount when the slip amount is really converged. Therefore, the command value of the fluid pressure supplied to the lockup clutch can be appropriately corrected by the learning.

In the control apparatus according to the second aspect of the invention, the given range is set such that zero of the slip amount is not included in the given range with respect to the target value, namely, such that the actual value of the slip amount is not in the given range when the actual value of the slip amount is zero, so that it is possible to appropriately obtain the correction amount when the slip amount is really converged.

In the control apparatus according to the third aspect of the invention, the given range is set such that one of the positive-side region and the negative-side region of the given range is wider than the other. Thus, the given range can be set such that zero of the slip amount is not included in the given range with respect to the target value.

In the control apparatus according to the fourth aspect of the invention, the negative-side region is set narrower than the positive-side region when the target value of the slip amount is a positive value, and the positive-side region is set narrower than the negative-side region when the target value of the slip amount is a negative value. Therefore, irrespective of whether the target value of the slip amount of the lockup clutch is a positive value or a negative value, the command value of the fluid pressure supplied to the lockup clutch can be appropriately corrected by the learning.

In the control apparatus according to the fifth aspect of the invention, it is determined that the actual value of the slip amount has been converged into the given range, when the state in which the actual value is in the given range has lasted for at least the given time. Thus, it is possible to obtain the correction amount when the slip control is being stably executed.

In the control apparatus according to the sixth aspect of the invention, the given range is the predetermined threshold range such that it is determined that the lockup clutch is controlled to be placed into the target slipping state, when it is determined that the actual value of the slip amount has been converged into the predetermined threshold range as the given range. Thus, the command value of the fluid pressure supplied to the lockup clutch can be appropriately corrected by the learning.

DETAILED DESCRIPTION OF PREFERRED EMBODIMENT

There will be described an embodiment of the present invention in details with reference to drawings.

Embodiment

Figure 1:
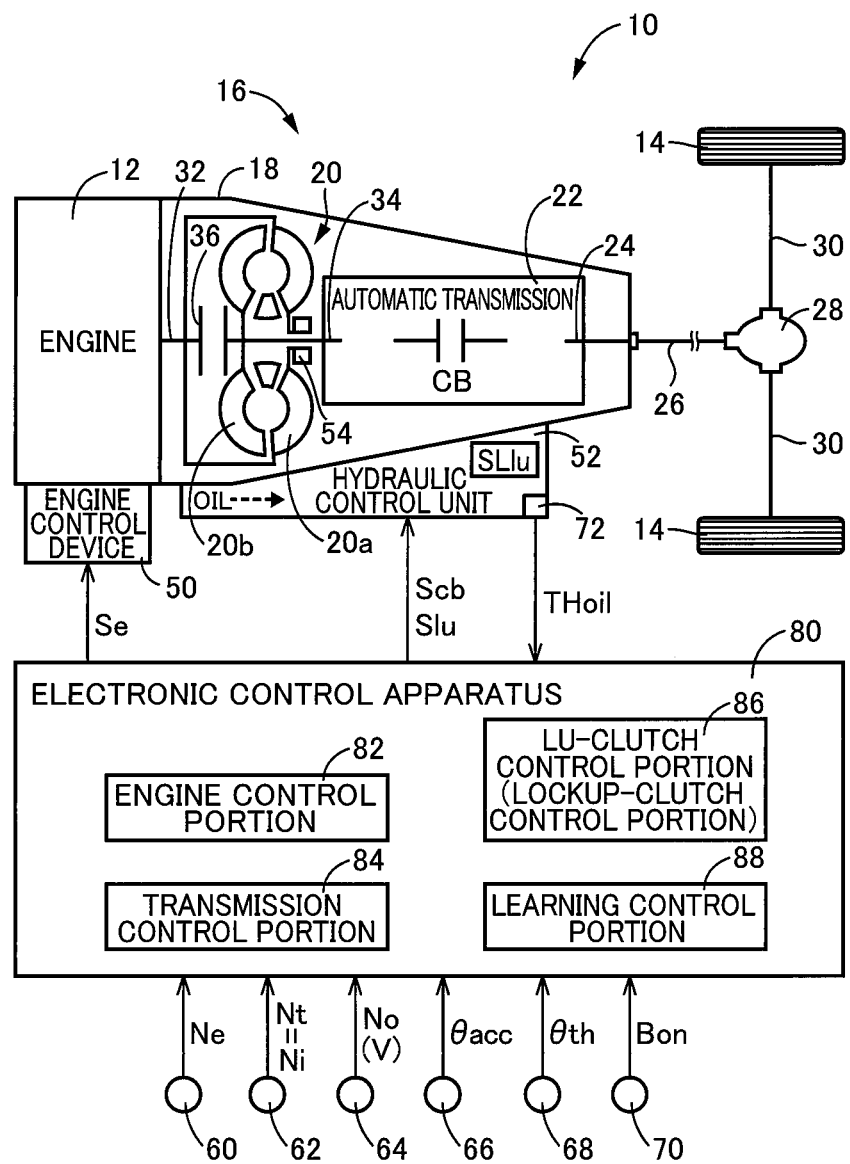
FIG. 1 is a view schematically showing a construction of a vehicle to which the present invention is to be applied, together with major portions of control functions and systems for executing various kinds of controls in the vehicle.

FIG. 1 is a view schematically showing a construction of a vehicle 10 to which the present invention is to be applied, together with major portions of control functions and systems for executing various kinds of controls in the vehicle 10. As shown in FIG. 1, the vehicle 10 includes an engine 12, drive wheels 14 and a power transmission device 16 provided in a power transmission path between the engine 12 and the drive wheels 14.

The engine 12 is a power source of the vehicle 10. The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 80 that is described below, an engine torque Te, which is an output torque of the engine 12, is controlled.

The power transmission device 16 includes a casing 18 as a non-rotary member that is attached to a body of the vehicle 10, a torque converter 20 connected to the engine 12, and an automatic transmission 22 which is connected to the torque converter 20 and which provided between the torque converter 20 and the drive wheels 14 in the power transmission path. The torque converter 20 and the automatic transmission 22 are disposed inside the casing 18. The power transmission device 16 further includes a propeller shaft 26 connected to a transmission output shaft 24 that is an output rotary member of the automatic transmission 22, a differential gear device 28 connected to the propeller shaft 26, and a pair of drive shafts 30 connected to the differential gear device 28. The power transmission device 16 still further includes an engine connection shaft 32 connecting between the engine 12 and the torque converter 20.

The torque converter 20 includes a pump impeller 20a connected to the engine connection shaft 32, and a turbine impeller 20b connected to a transmission input shaft 34 that is an input rotary member of the automatic transmission 22. The pump impeller 20a is an input member of the torque converter 20 while the turbine impeller 20b is an output member of the torque converter 20. The engine connection shaft 32 is also an input rotary member of the torque converter 20. The transmission input shaft 34 is also an output rotary member of the torque converter 20, which is formed integrally with a turbine shaft that is to be driven and rotated by the turbine impeller 20b. The torque converter 20 is a fluid transmission device which is provided in the power transmission path between the engine 12 and the drive wheels 14 and which is configured to transmit a power of the engine 12 from the engine connection shaft 32 to the transmission input shaft 34, through a fluid circulating in the torque converter 20. The torque converter 20 includes an LU clutch 36 configured to connect between the pump impeller 20a and the turbine impeller 20b, i.e., between the engine connection shaft 32 and the transmission input shaft 34. The LU clutch 36 is a known lockup clutch, i.e., a direct clutch configured to connect between the input and output rotary members of the torque converter 20.

The LU clutch 36 is a hydraulically-operated frictional engagement device constituted by a multiple-disc type or single-disc type clutch, for example. A controlled or operation state of the LU clutch 36 is to be switched among an engaged state, a slipping state and a released state, with an LU torque Tlu (that corresponds to a torque capacity of the LU clutch 36) being changed by an LU hydraulic pressure PRlu that is regulated and supplied by a hydraulic control unit (hydraulic control circuit) 52 provided in the vehicle 10.

As the operation state of the LU clutch 36, there are a released state (that may be referred also to as "fully released state") in which the LU clutch 36 is released, a slipped state in which the LU clutch 36 is engaged with slipping, and an engaged state (that may be referred also to as "fully engaged state") in which the LU clutch 36 is engaged. When the LU clutch 36 is placed in the released state, the torque converter 20 is placed in a torque converter state in which a torque boosting effect is obtained. When the LU clutch 36 is placed in the engaged state, the torque converter 20 is placed in a lockup state in which the pump impeller 20a and the turbine impeller 20b are rotated integrally with each other.

The automatic transmission 22 is a known automatic transmission of a planetary gear type which includes at least one planetary gear device (not shown) and an engagement device CB. The engagement device CB includes, for example, a plurality of hydraulically-operated frictional coupling devices each of which is configured to receive a CB hydraulic pressure PRcb that is a regulated hydraulic pressure supplied from the hydraulic control unit 52, whereby a CB torque Tcb, i.e., torque capacity of each coupling device of the engagement device CB is changed and its controlled or operation state is switched among an engaged state, a slipping state and a released state, for example.

The automatic transmission 22 is a step-variable automatic transmission configured to establish a selected one of a plurality of gear positions, with a corresponding one or ones of the coupling devices of the engagement device CB being engaged, wherein the gear positions are different from each other in gear ratio (speed ratios) γat (=AT input rotational speed Ni/AT output rotational speed No). The automatic transmission 22 is configured to switch from one of the gear positions to another one of the gear positions, namely, to establish one of the gear positions which is selected, by the electronic control apparatus 80, depending on, for example, an accelerating operation made by a vehicle driver (operator) and a running speed V of the vehicle 10. The AT input rotational speed Ni is a rotational speed of the transmission input shaft 34, and is an input rotational speed of the automatic transmission 22. The AT input rotational speed Ni is equal to a turbine rotational speed Nt that is an output rotational speed of the torque converter 20. Therefore, the AT input rotational speed Ni can be represented by the turbine rotational speed Nt. The AT output rotational speed No is a rotational speed of the transmission output shaft 24, and is an output rotational speed of the automatic transmission 22.

In the power transmission device 16, the power outputted from the engine 12 is transmitted to the drive wheels 14 from the engine connection shaft 32 through sequentially the torque converter 20, automatic transmission 22, propeller shaft 26, differential gear device 28 and drive shafts 30, for example. The power corresponds to a drive power, a torque and a force, unless otherwise specified.

The vehicle 10 further includes an MOP 54 that is a mechanically-operated oil pump. The MOP 54 is connected to the pump impeller 20a, and is to be rotated and driven by the engine 12, so as to output a working fluid OIL that is to be used in the power transmission device 16. The working fluid OIL outputted by the MOP 54 is supplied to the hydraulic control unit 52. The hydraulic control unit 52, which receives the working fluid OIL as an original hydraulic pressure, supplies regulated hydraulic pressures that serve as the CB hydraulic pressure PRcb and the LU hydraulic pressure PRlu, for example.

The vehicle 10 is provided with the electronic control apparatus 80 including a control apparatus for the vehicle 10. The electronic control apparatus 80 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 80 may be constituted by two or more control units exclusively assigned to perform respective different control operations such as an engine control operation, a clutch control operation and a transmission control operation, as needed.

The electronic control apparatus 80 receives various input signals based on values detected by respective sensors provided in the vehicle 10. Specifically, the electronic control apparatus 80 receives: an output signal of an engine speed sensor 60 indicative of an engine rotational speed Ne that is a rotational speed of the engine 12; an output signal of a turbine speed sensor 62 indicative of a turbine rotational speed Nt that is equal to the AT input rotational speed Ni; an output signal of an output speed sensor 64 indicative of the AT output rotational speed No corresponding to the vehicle running speed V; an output signal of an accelerator-opening degree sensor 66 indicative of an accelerator opening degree (accelerator operation degree) θacc representing an amount of accelerating operation made by the vehicle driver; an output signal of a throttle-opening degree sensor 68 indicative of a throttle opening degree θth which is an opening degree of an electronic throttle valve; an output signal of a brake switch 70 which is a brake-ON signal Bon representing a state in which a brake pedal is being operated by the vehicle driver so as to operate wheel brakes; and an output signal of a fluid temperature sensor 72 indicative of a working-fluid temperature THoil that is a temperature of the working fluid OIL in the hydraulic control unit 52. The engine rotational speed Ne is equal to an input rotational speed of the torque converter 20, i.e., an LU input rotational speed that is an input rotational speed of the LU clutch 36.

The electronic control apparatus 80 generates various output signals to the various devices provided in the vehicle 10, such as: an engine control command signal Se that is to be supplied to the engine control device 50 for controlling the engine 12; a CB hydraulic control command signal Scb that is to be supplied to the hydraulic control unit 52 for controlling the operation states of the coupling devices of the engagement device CB; and an LU hydraulic control command signal SLu that is to be supplied to the hydraulic control unit 52 for controlling the operation state of the LU clutch 36.

There will be described the LU hydraulic control command signal Slu as one of the hydraulic control command signals S. The electronic control apparatus 80 calculates an LU command pressure value Splu that is a command value of the LU hydraulic pressure PRlu as a fluid pressure supplied from the hydraulic control unit 52 to the LU clutch 36, namely, that is a command value for commanding the hydraulic control unit 52 to supply the regulated LU hydraulic pressure PRlu to the LU clutch 36. The command value of the LU hydraulic pressure PRlu is the fluid pressure is a target pressure value commanded by the electronic control apparatus 80 to a working fluid OIL supplied to the LU clutch 36 as an engagement device, so that an actual hydraulic pressure value that is an actual value of the LU hydraulic pressure PRlu supplied to the LU clutch 36 is changed in accordance with the command value of the LU hydraulic pressure PRlu. The electronic control apparatus 80 converts the LU command pressure value Splu into an LU command electric current value Silu for driving an LU solenoid SLlu that is provided in the hydraulic control unit 52. The LU solenoid SLlu is a solenoid valve through which the LU hydraulic pressure PRlu is to be outputted to the LU clutch 36. The LU command electric current value Silu is a command value of an electric current supplied to a solenoid driver as a drive circuit that is provided in the electronic control apparatus 80, for driving the LU solenoid SLlu. The LU hydraulic control command signal Slu is a drive current or drive voltage for causing the solenoid driver to drive the LU solenoid SLlu based on the LU command electric current value Silu. That is, the LU command pressure value Splu is converted into the LU hydraulic control command signal Slu that is supplied to the hydraulic control unit 52. In the following description of the present embodiment, the terms "LU command pressure value Splu" and "LU hydraulic control command signal Slu" are treated to be synonymous with each other.

For performing various control operations in the vehicle 10, the electronic control apparatus 80 includes an engine control means in the form of an engine control portion 82, a transmission control means in the form of a transmission control portion 84, an LU-clutch control means in the form of an LU-clutch control portion 86, and a learning control means in the form of a learning control portion 88.

The engine control portion 82 is a power-source control means in the form of a power-source control portion configured to control operation of the engine 12 as the power source. The engine control portion 82 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem to be applied to the drive wheels 14. As the requested drive amount, another value such as a requested drive force Frdem [N] to be applied to the drive wheels 14 and a requested AT output torque to be applied to the transmission output shaft 24 may be used, too. In the calculation of the requested drive amount, it is also possible to use, for example, the AT output rotational speed No in place of the vehicle running speed V. The engine control portion 82 outputs the engine control command signal Se for controlling the engine 12 such that the requested drive torque Trdem is realized by the outputted engine control command signal Se supplied to the engine control device 50, by taking account of various factors such as a transmission loss, an auxiliary load and the gear ratio γat of the automatic transmission 22.

The transmission control portion 84 determines whether a shifting action is to be executed in the automatic transmission 22, by using, for example, a shifting map that represents a predetermined relationship, and outputs the CB hydraulic control command signal Scb, as needed, which is supplied to the hydraulic control unit 52, for executing the shifting action in the automatic transmission 22, depending on the determination using the shifting map. The shifting action is executed by the transmission control portion 84, for example, by switching at least one of the coupling devices of the engagement device CB from the engaged state to the released state while switching at least another one of the coupling devices of the engagement device CB from the released state to the engaged state. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 22. In the shifting map, one of the two variables may be the AT output rotational speed No in place of the vehicle running speed V, and the other of the two variables may be any one of the requested drive force Frdem, accelerator opening degree θacc and throttle opening degree θth in place of the requested drive torque Trdem.

The LU-clutch control portion 86, which corresponds to "lockup-clutch control portion" recited in the appended claims, is configured to control the controlled or operation state of the LU clutch 36 so as to place the LU clutch 36 into one of the released state, slipping state and engaged state. Specifically described, the LU-clutch control portion 86 determines a control region by using, for example, a lockup region diagram that represents a predetermined relationship, and outputs the LU hydraulic control command signal Slu to the hydraulic control unit 52, for supplying the LU clutch 36 the LU hydraulic pressure PRlu that establishes the operation state corresponding to the determined control region. In the lockup region diagram, the predetermined relationship is represented by lines in two-dimensional coordinates in which the vehicle running speed V and the requested drive torque Trdem as two variables are taken along respective two axes, wherein a lockup OFF region (fully released region), a slipping region and a lockup ON region (fully engaged region) are defined by the lines.

When determining that the control region is in the lockup ON region, the LU-clutch control portion 86 sets the LU hydraulic pressure PRlu to a pressure value that provides the LU torque Tlu by which an LU input torque Tinlu (i.e., the input torque to the LU clutch 36) is transmittable through the LU clutch 36, and executes a lockup control for placing the LU clutch 36 into the fully engaged state. The LU input torque Tinlu corresponds to the engine torque Te, for example. The LU torque Tlu, by which the LU input torque Tinlu is transmittable through the LU clutch 36, is a torque value that is obtained, for example, by multiplying the LU input torque Tinlu by a safety factor (>1).

When the LU torque Tlu is small relative to the LU input torque Tinlu, slip occurs in the LU clutch 36. When determining that the control region is in the slipping region, the LU-clutch control portion 86 sets the LU hydraulic pressure PRlu to a pressure value that realizes a target LU slip amount Nslplut that is a targe value of an LU slip amount Nslplu as the slip amount of the LU clutch 36 in presence of the LU input torque Tinlu, and executes an LU slip control as a slip control for establishing a target slipping state (that belongs to the above-described slipping state) of the LU clutch 36, which realize the target LU slip amount Nslplut. That is, the LU-clutch control portion 86 executes the LU slip control for controlling the LU clutch 36 so as to place the LU clutch 36 into the slipping state by setting the LU command pressure value Splu that realizes the target LU slip amount Nslplut. The LU slip amount Nslplu is a difference (=Ne−Nt) between the LU input rotational speed (=engine rotational speed Ne) and the LU output rotational speed (=turbine rotational speed Nt), wherein the difference is obtained by subtracting the LU output rotational speed from the LU input rotational speed. In the above-described lockup region diagram, the slipping region is located on a lower-running-speed side of the lockup ON region, and is a region in which execution of the lockup control is difficult and in which the slipping state is to be established for improving an energy efficiency and a drivability. Further, the slipping region is also a region that is set by taking account of the drivability and a booming noise or the like (e.g., NV performance against noise and vibration).

The LU slip control is categorized into an acceleration-stage slip control and a deceleration-stage slip control. The acceleration-stage slip control is to be executed to control the LU clutch 36 for maintaining the slipping state, for example, when the vehicle 10 starts running with an accelerator being switched from an OFF state to an ON state, when the vehicle 10 is normally running with the ON state of the accelerator being kept, and/or when the vehicle 10 is being accelerated with the accelerator being further depressed. Thus, when the vehicle 10 is in a driving state, it is possible to suppress increase of the engine rotational speed Ne and the booming noise in a cabin of the vehicle 10, for example. The deceleration-stage slip control is to be executed to control the LU clutch 36 for enabling the engine 12 to be rotated following rotation of the transmission input shaft 34, when the vehicle 10 is being decelerated with the accelerator being in the OFF state. Thus, when the vehicle 10 is in a driven state, it is possible to enlarge a fuel-cut region in which a fuel-cut operation can be executed to stop fuel supply to the engine 12, for example. With the LU slip amount Nslplu being appropriately controlled by the LU slip control, the energy efficiency and the NV performance can be both improved, for example.

Figure 2:
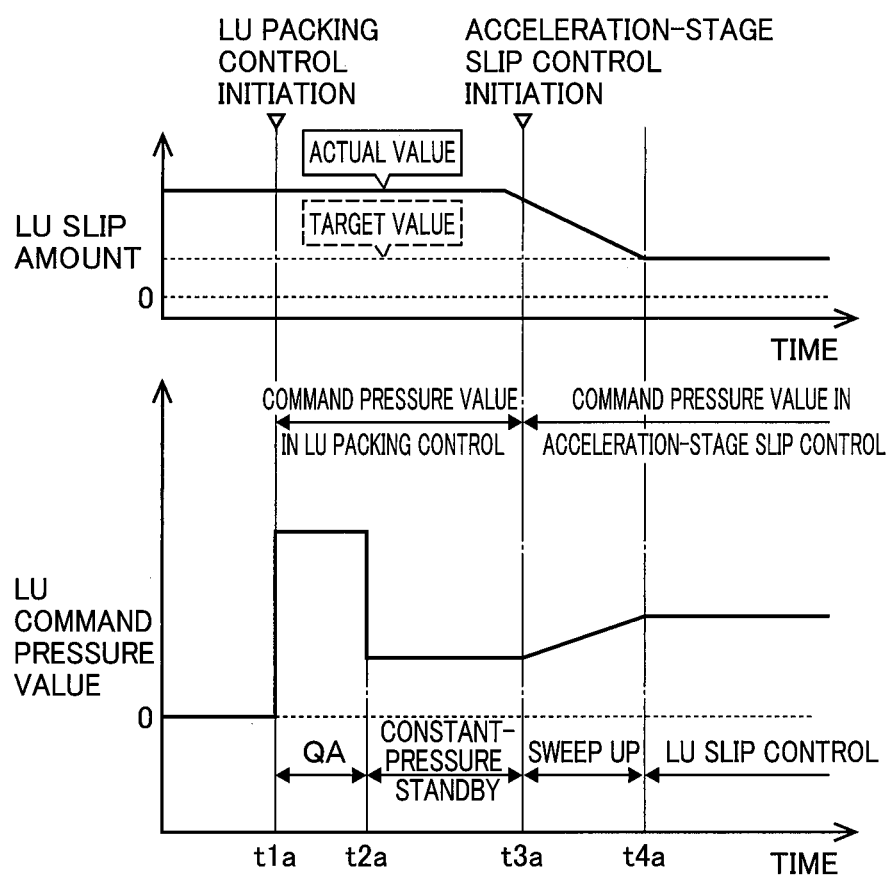
FIG. 2 is a view showing an example of a time chart where an acceleration-stage slip control is executed.

FIG. 2 is a view showing an example of a time chart where the acceleration-stage slip control is executed when the LU clutch 36 is switched from the released state to the slipping state. In FIG. 2, a time point t1a indicates a time point at which an LU-packing control is initiated as a result of determination that the control region reaches the slipping region, for example, during acceleration of the vehicle 10, wherein the LU-packing control is a packing control for eliminating a pack clearance of the LU clutch 36. The packing control is a control that is to be executed to place the frictional engagement device into a packing completed state in which the pack clearance in each friction plate is eliminated in the frictional engagement device. The packing completed state of the frictional engagement device is a state in which the frictional engagement device starts to have the torque capacity if the hydraulic pressure supplied to the frictional engagement device is increased from the packing completed state. In the LU-packing control, first, a quick apply (=QA) is executed (see a time point t1a to a time point t2a) to temporarily increase the outputted LU command pressure value Splu at a high rate to a quick-filling pressure value, such that the LU hydraulic pressure PRlu becomes a quick filling pressure, for improving an initial responsiveness of the LU hydraulic pressure PRlu. Then, a constant-pressure standby is executed (see the time point t2a to a time point t3a) to keep the outputted LU command pressure value Splu in a standby constant pressure value lower than the quick-filling pressure value, for completing elimination of the pack clearance of the LU clutch 36. When a given QA time (that is required to complete the LU-packing control) and a constant-pressure standby time have elapsed from an initiation of the LU-packing control (see the time point t3a), the acceleration-stage slip control is initiated. In the acceleration-stage slip control, a sweep-up is executed (see the time point t3a to a time point t4a) to gradually increase the LU command pressure value Splu such that an actual LU slip amount Nslplur as an actual value of the LU slip amount Nslplu becomes close to the target LU slip amount Nslplut. Thereafter (see after the time point t4a), the LU slip control is executed to set the outputted LU command pressure value Splu to a pressure value by which the actual LU slip amount Nslplur becomes substantially equal to the target LU slip amount Nslplut.

When executing the LU slip control, the LU-clutch control portion 86 corrects the LU command pressure value Splu by a feedback (=FB) control, such that the actual LU slip amount Nslplur becomes substantially equal to the target LU slip amount Nslplut. To this end, the LU-clutch control portion 86 corrects the LU command pressure value Splu by the FB control during the LU slip control that is executed after the time point t4a as shown in FIG. 2, such that the actual LU slip amount Nslplur is made substantially equal to the target LU slip amount Nslplut by the command pressure value Splu. Specifically described, the LU-clutch control portion 86 corrects the LU command pressure value Splu by adding a hydraulic-pressure FB value Splufb as an FB amount to a hydraulic-pressure FF value Spluff as a feedforward (=FF) amount, as shown in the following formula (1). In the following formula (1), "Spluff" represents the hydraulic-pressure FF value that is the LU command pressure value Splu for causing the actual LU slip amount Nslplur to become substantially equal to the target LU slip amount Nslplut, and "Splufb" represents the hydraulic pressure FB value that is a correction amount by which command pressure value Splu is to be corrected, namely, a correction amount which is to be added to the hydraulic-pressure FF value Spluff, through the FB control. The LU-clutch control portion 86 calculates the hydraulic-pressure FF value Spluff by using a map or function defining a value dependent on the LU input torque Tinlu and the target LU slip amount Nslplut, for example. The map or function is preformulated such that the hydraulic-pressure FF value Spluff is increased as the LU input torque Tinlu is increased, for example. The LU-clutch control portion 86 calculates the hydraulic-pressure FB value Splufb, for example, by using the following formula (2) that is a preformulated FB control formula including a proportional term (P component), an integral term (I component) and a derivative term (D component). In the following formula (2), a first term of a right side is the proportional term, a second term of the right side is the integral term, and a third term of the right side is the derivative term. Further, in the following formula (2), "ΔNs" represents a slip amount difference (=Nslplur−Nslplut) that is a difference between the actual LU slip amount Nslplur and the target LU slip amount Nslplut, "Kp" represents a proportional constant (gain), "Ki" represents an integral constant (gain) and "Kd" represents a derivative constant (gain).

$$Splu=Spluff+Splufb \quad (1)$$

$$Splufb=Kp \times \Delta Ns+Ki \times \int (\Delta Ns)dt+Kd \times d(\Delta Ns)/dt \quad (2)$$

In the LU slip control, the learning control portion 88 obtains the hydraulic pressure FB value, when determining that the actual LU slip amount Nslplur has been converged into a given range RNGf with respect to the target LU slip amount Nslplut. The learning control portion 88 corrects the LU command pressure value Splu that is to be set for a next execution of the LU slip control, by learning with use of the obtained hydraulic pressure FB value. The hydraulic pressure FB value is a learning value for learning the LU command pressure value Splu. The LU command pressure value Splu, which is set for the next execution of the LU slip control, is the hydraulic-pressure FF value Spluff that is calculated with use of, for example, the preformulated map or function. The learning control portion 88 rewrites the hydraulic-pressure FF value Spluff (Tinlu, Nslplut) defined as the value dependent on the LU input torque Tinlu and the target LU slip amount Nslplut in the map or function that is used in a current execution of the LU slip control, by adding the hydraulic pressure FB value to the hydraulic-pressure FF value Spluff (Tinlu, Nslplut) defined in the map or function. The given range RNGf is a predetermined threshold range, such that it can be determined that the LU clutch 36 is controlled to be placed into a target slipping state that belong to the slipping state, when it is determined that the actual LU slip amount Nslplur has been converged into the predetermined threshold range as the given range RNGf. With the LU command pressure value Splu being learned to make it possible to appropriately control the LU slip amount Nslplu in the LU slip control, it is possible to deal with individual variations and aging deterioration, for example.

There could be a case in which the actual LU slip amount Nslplur is temporarily in the given range RNGf, due to influence of noise or the like, or when the actual LU slip amount Nslplur is changed largely. In such a case, it should not be determined that the actual LU slip amount Nslplur has been converged into the given range RNGf. Therefore, the learning control portion 88 determines that the actual LU slip amount Nslplur has been converged into the given range RNGf, when a state in which the actual LU slip amount Nslplur is in the given range RNGf has lasted for at least a given time TM. The given time TMf is a predetermined threshold value, such that it can be determined that the LU slip control is being stably executed when the above-scribed state has lasted for at least the threshold value as the given time TMf.

By the way, if the given range RNGf, which is used for the determination as to whether the actual LU slip amount Nslplur has been converged into the given range RNGf or not, were determined regardless of the target LU slip amount Nslplut, it could be determined that the actual LU slip amount Nslplur has been converged into the given range RNGf, even in a case in which the LU slip control is not being stably executed. For example, when the actual LU slip amount Nslplur is zero, actually, the LU clutch 36 has been placed into a fully engaged state, rather than that the slip control is stably performed. Where the given range RNGf of the LU slip amount Nslplu includes zero, there is a case in which it is determined that the actual LU slip amount Nslplur has been converged into the given range RNGf when the actual LU slip amount Nslplur is zero. Therefore, if the hydraulic pressure FB value upon such a determination were used in the next execution of the slip control, the LU command pressure value Splu is unlikely to be appropriately corrected by the learning.

In the present embodiment, the learning control portion 88 sets the given range RNGf, depending on the target LU slip amount Nslplut.

Figure 3:
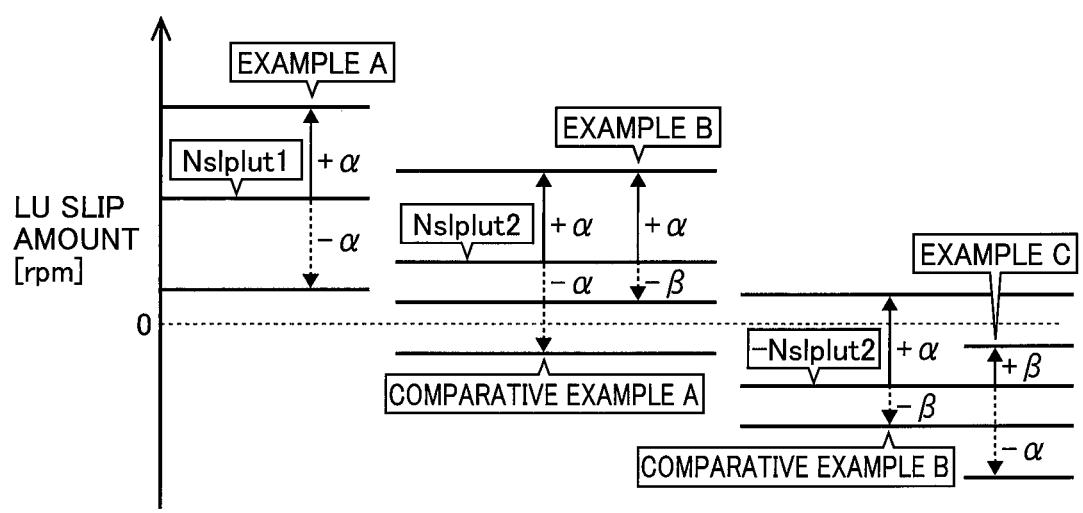
FIG. 3 is a view showing, by way of examples, a method of setting a given range.

FIG. 3 is a view showing, by way of examples, a method of setting the given range RNGf, wherein "α (>0)", "β (>0)", "Nslplut1 (>0)" and "Nslplut2 (>0)" are represented. It is noted that "+α" and "−α" are equal to each other in absolute value and that "+β" and "−β" are equal to each other in absolute value.

In an example A, the given range RNGf is set to "±α" with respect to the first target LU slip amount Nslplut1, so that the given range RNGf includes a positive-side region ranging from the first target LU slip amount Nslplut1 to a sum of the first target LU slip amount Nslplut1 and "+α" while a negative-side region ranging from the first target LU slip amount Nslplut1 to a sum of the first target LU slip amount Nslplut1 and "−α". In this example A, neither the positive-side region (in which the LU slip amount Nslplu is larger than the first target LU slip amount Nslplut1) nor the negative-side region (in which the LU slip amount Nslplu is smaller than the first target LU slip amount Nslplut1) includes zero of the LU slip amount Nslplu, so that it is not determined that the actual LU slip amount Nslplur has been converged into the given range RNGf when the actual LU slip amount Nslplur is zero.

On the other hand, in a comparative example A, the given range RNGf is set to "±α" with respect to the second target LU slip amount Nslplut2 (that is smaller than the first target LU slip amount Nslplut1) as in the example A. However, in this comparative example A, unlike in the example A, the negative-side region (that ranges from the second target LU slip amount Nslplut2 to a sum of the second target LU slip amount Nslplut2 and "−α") includes zero of the LU slip amount Nslplu, so that it could be determined that the actual LU slip amount Nslplur has been converged into the given range RNGf when the actual LU slip amount Nslplur is zero, and accordingly the LU command pressure value Splu is unlikely to be appropriately corrected by the learning.

In an example B, the positive-side region ranges from the second target LU slip amount Nslplut2 to a sum of the second target LU slip amount Nslplut2 and the "+α", like in the comparative example A, while the negative-side region ranges from the second target LU slip amount Nslplut2 to a sum of the second target LU slip amount Nslplut2 and the "−β", unlike in the comparative example A. "β" is smaller than "α", such that the negative-side region as well as the positive-side region does not include zero of the LU slip amount Nslplu. Therefore, in the example B as well as in the example A, it is not determined that the actual LU slip amount Nslplur has been converged into the given range RNGf when the actual LU slip amount Nslplur is zero.

On the other hand, in a comparative example B, the given range RNGf is set with respect to the second target LU slip amount Nslplut2 where the second target LU slip amount Nslplut2 is a negative value, such that the positive-side region ranges from the second target LU slip amount Nslplut2 to a sum of the second target LU slip amount Nslplut2 and the "+α", like in the example B, while the negative-side region ranges from the second target LU slip amount Nslplut2 to a sum of the second target LU slip amount Nslplut2 and the "+β", like in the example B. However, unlike in the example B, in this comparative example B, the positive-side region includes zero of the LU slip amount Nslplu, so that it could be determined that the actual LU slip amount Nslplur has been converged into the given range RNGf when the actual LU slip amount Nslplur is zero, and accordingly the LU command pressure value Splu is unlikely to be appropriately corrected by the learning.

In an example C, the given range RNGf is set with respect to the second target LU slip amount Nslplut2 where the second target LU slip amount Nslplut2 is the negative value, such that the positive-side region ranges from the second target LU slip amount Nslplut2 to a sum of the second target LU slip amount Nslplut2 and the "+β", while the negative-side region ranges from the second target LU slip amount Nslplut2 to a sum of the second target LU slip amount Nslplut2 and the "−α". "β" is smaller than "α", such that the positive-side region as well as the negative-side region does not include zero of the LU slip amount Nslplu. Therefore, in the example C as well as in the examples A and B, it is not determined that the actual LU slip amount Nslplur has been converged into the given range RNGf when the actual LU slip amount Nslplur is zero.

Thus, the learning control portion 88 sets the given range RNGf such that zero of the LU slip amount Nslplu is not included in the given range RNGf, namely, such that the actual LU slip amount Nslplur is not in the given range RNGf when the actual LU slip amount Nslplur is zero. For example, the learning control portion 88 sets the given range RNGf, such that one of the positive-side region and the negative-side region of the given range RNGf is wider than the other of the positive-side region and the negative-side region of the given range RNGf. Specifically, the learning control portion 88 sets the negative-side region narrower than the positive-side region when the target LU slip amount Nslplut is a positive value, and sets the positive-side region narrower than the negative-side region when the target LU slip amount Nslplut is a negative value.

Described more specifically, the learning control portion 88 determines whether the LU slip control is being executed by the LU-clutch control portion 86, or not. When determining that the LU slip control is being executed, the learning control portion 88 determines whether a learning basic condition is satisfied or not, wherein the learning basic condition is a condition which is required to learn the LU command pressure value Splu and which is one of learning conditions. The learning basic condition is other than a learning-value obtaining condition that is another one of the learning conditions. The learning basic condition includes, for example, a requirement that the working fluid temperature THoil is a normal temperature value after completion of warning of the working fluid, a requirement that the vehicle running speed V is in a stable middle range or higher and a requirement that the engine torque Te is in a stable range. When determining that the LU slip control is being executed, the learning control portion 88 further determines whether the learning-value obtaining condition as the another one of the learning conditions is satisfied or not. The learning-value obtaining condition is a condition that the actual LU slip amount Nslplur has been converged into the given range RNGf that is set based on the target LU slip amount Nslplut.

When determining that the LU slip control is being executed and that the learning conditions (the learning basic condition and the learning-value obtaining condition) are satisfied, the learning control portion 88 obtains the hydraulic pressure FB value as the learning value and stores the obtained hydraulic pressure FB value, for example, in the electronic control apparatus 80. The learning control portion 88 corrects the hydraulic-pressure FF value Spluff that is to be set for the next execution of the LU slip control, by learning with use of the obtained hydraulic pressure FB value.

Figure 4:
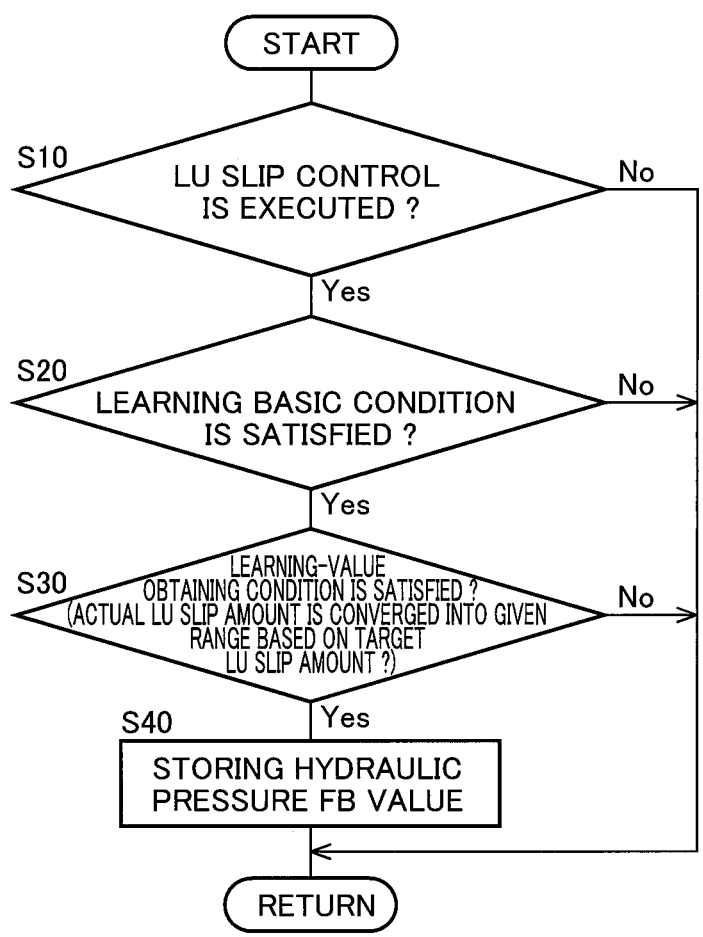
FIG. 4 is a flow chart showing a control routine to be executed by an electronic control apparatus, so as to appropriately correct an LU command pressure value by learning.
Figure 5:
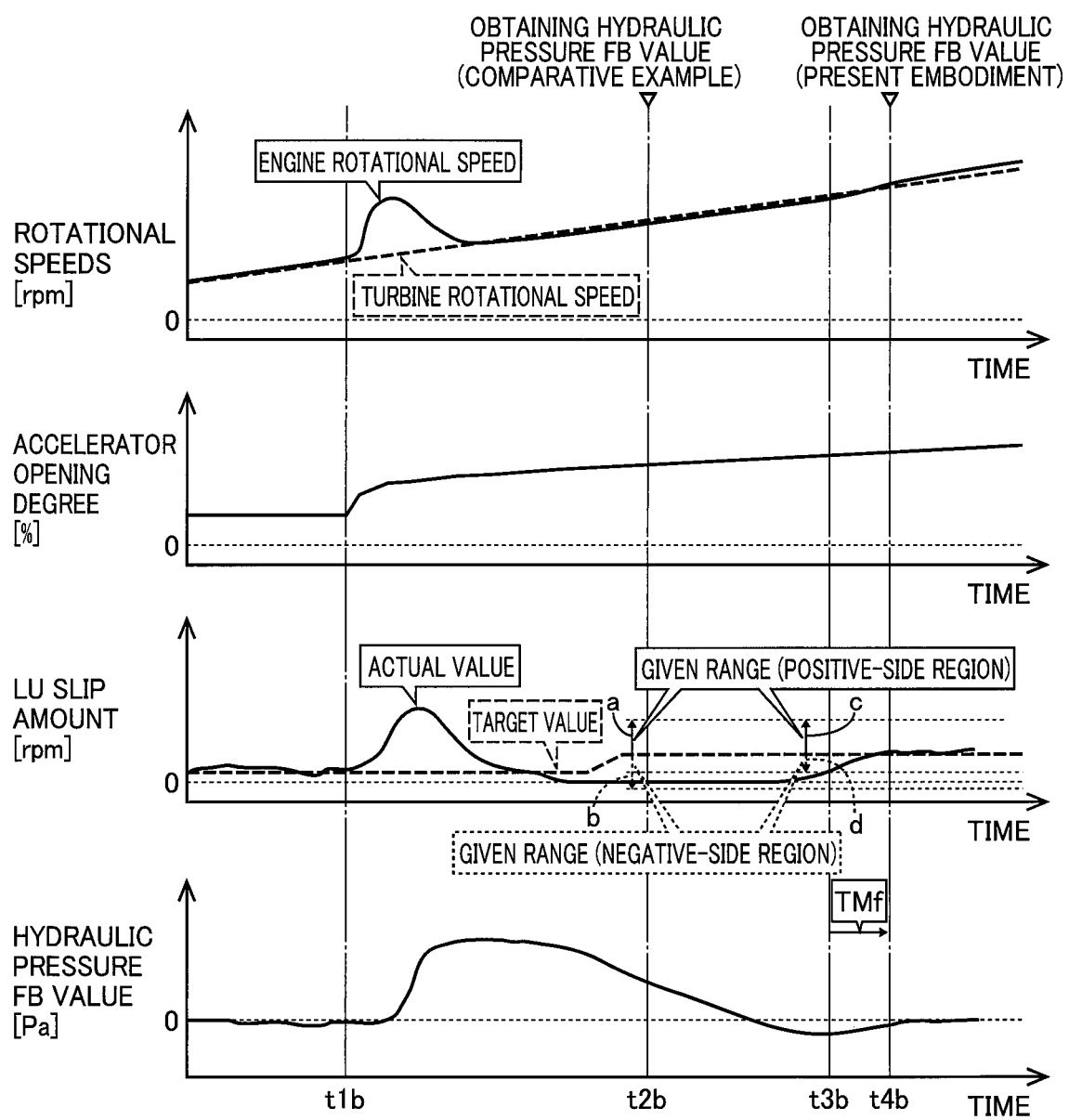
FIG. 5 is a view showing, by way of example, a time chart where the control routine shown in the flow chart of FIG. 4 is executed.

FIG. 4 is a flow chart showing a main part of a control routine to be executed by the electronic control apparatus 80, so as to appropriately correct the LU command pressure value Splu by the learning. This control routine is to be executed in a repeated manner. FIG. 5 is a view showing, by way of example, a time chart where the control routine shown in the flow chart of FIG. 4 is executed.

Each of steps S10 through S40 of the control routine shown in the flow chart of FIG. 4 corresponds to function of the learning control portion 88. As shown in FIG. 4, the control routine is initiated with step S10 that is implemented to determine whether the LU slip control is being executed or not. When a negative determination is made at step S10, one cycle of execution of the control routine is terminated. When an affirmative determination is made at step S10, step S20 is implemented to determine whether the learning basic condition is satisfied or not. When a negative determination is made at step S20, one cycle of execution of the control routine is terminated. When an affirmative determination is made at step S20, step S30 is implemented to determine whether the learning-value obtaining condition is satisfied or not, namely, whether the actual LU slip amount Nslplur has been converged into the given range RNGf that is set based on the target LU slip amount Nslplut. When a negative determination is made at step S30, one cycle of execution of the control routine is terminated. When an affirmative determination is made at step S30, step S40 is implemented to obtain the hydraulic pressure FB value as the learning value and to store the obtained hydraulic pressure FB value.

FIG. 5 is a view showing, by way of example, a case in which learning of the LU command pressure value Splu is executed during execution of the acceleration-stage slip control. In FIG. 5, a time point t1b is a time point at which the accelerator is further depressed during acceleration of the vehicle 10 with the accelerator being kept in the ON state. Even during the execution of the acceleration-stage slip control, the engine torque Te is quickly increased in response to further depression of the accelerator, whereby the engine rotational speed Ne is temporarily increased (see after the time point t1b). Therefore, the hydraulic pressure FB value is quickly increased whereby the actual LU slip amount Nslplur is reduced toward the target LU slip amount Nslplut (see the time point t1b to a time point t2b). In this instance, since the actual LU slip amount Nslplur is not immediately reduced toward a negative value even by the quick increase of the hydraulic pressure FB value, the actual LU slip amount Nslplur is made smaller than the target LU slip amount Nslplut by increase of the LU command pressure value Splu. In this instance, even if the LU command pressure value Splu is increased largely, the LU clutch 36 is placed into the fully engaged state, but the actual LU slip amount Nslplur is not made smaller than zero. In a comparative example, the positive-side region (see solid arrow a)

and the negative-side region (see dashed arrow b) of the given range RNGf have the same width as each other. Since the negative-side region of the given range RNGf includes zero of the LU slip amount Nslplu, it is determined that the actual LU slip amount Nslplur has been converged into the given range RNGf when the actual LU slip amount Nslplur is zero, so that the hydraulic pressure FB value upon the determination is obtained (see the time point t2b). If the learning of the LU command pressure value Splu is executed with use of the hydraulic pressure FB value obtained upon such a determination, although the actual LU slip amount Nslplur is smaller than the target LU slip amount Nslplut, the correction is made to the LU command pressure value Splu such that the hydraulic pressure FB value as a positive value is added to the hydraulic-pressure FF value Spluff in the next execution of the slip control. If such a correction is repeatedly made, the LU command pressure value Splu would be excessively increased whereby a sudden engagement shock is likely to occur in the LU clutch 36. This phenomenon is likely to occur when the target LU slip amount Nslplut is a small value. On the other hand, in the present embodiment, the target LU slip amount Nslplut is set based on the given range RNGf. In the case shown in FIG. 5 in which the target LU slip amount Nslplut is a positive value, the negative-side region (see dashed arrow d) of the given range RNGf is set to be narrower than the positive-side region (see solid arrow c) of the given range RNGf, so that the actual LU slip amount Nslplur is not in the given range RNGf when the actual LU slip amount Nslplur is zero (see the time point t2b to a time point t3b). Therefore, in the present embodiment, even where the target LU slip amount Nslplut is a small value, the hydraulic pressure FB value in a state in which the actual LU slip amount Nslplur is zero with the LU clutch 36 being in the fully engaged state as a result of excessive increase of the LU command pressure value Splu, is not used for the learning of the LU command pressure value Splu. Further, in the present embodiment, when a state in which the actual LU slip amount Nslplur is in the negative-side region (see dashed arrow d) of the given range RNGf has lasted at least the given time TMf, the hydraulic pressure FB value is obtained (see a time point t4b), and the learning of the LU command pressure value Splu is appropriately executed with use of the obtained hydraulic pressure FB value.

As described above, in the present embodiment, in the learning of the LU command pressure value Splu, which is made in execution of the LU slip control, the given range RNGf is set depending on the target LU slip amount Nslplut. As compared with an arrangement in which the given range RNGf is set regardless of the target LU slip amount Nslplut, it is possible to more easily obtain the hydraulic pressure FB value when the actual LU slip amount Nslplur is really converged, namely, when the LU slip control becomes stabilized. Therefore, the LU command pressure value Splu can be appropriately corrected by the learning. That is, it is possible to appropriately set the given range RNGf by which the learning can be made without error, although a region in which converge of the actual LU slip amount Nslplur can be determined varies depending on the target LU slip amount Nslplut.

In the present embodiment, the given range RNGf is set such that zero of the LU slip amount Nslplu is not included in the given range RNGf with respect to the target LU slip amount Nslplut, namely, such that the actual LU slip amount Nslplur is not in the given range RNGf when the actual LU slip amount Nslplur is zero, so that it is possible to appropriately obtain the hydraulic pressure FB value when the actual LU slip amount Nslplur is really converged.

In the present embodiment, the given range RNGf is set such that one of the positive-side region and the negative-side region of the given range RNGf is wider than the other. Thus, the given range RNGf can be set such that zero of the LU slip amount Nslplu is not included in the given range RNGf with respect to the target LU slip amount Nslplut.

In the present embodiment, the negative-side region of the given range RNGf is set narrower than the positive-side region of the given range RNGf when the target LU slip amount Nslplut is a positive value, and the positive-side region of the given range RNGf is set narrower than the negative-side region of the given range RNGf when the target LU slip amount Nslplut is a negative value. Therefore, irrespective of whether the target LU slip amount Nslplut is a positive value or a negative value, the LU command pressure value Splu can be appropriately corrected by the learning.

In the present embodiment, it is determined that the actual LU slip amount Nslplur has been converged into the given range RNGf, when the state in which the actual LU slip amount Nslplur is in the given range RNGf has lasted for at least the given time RNGf. Thus, it is possible to obtain the hydraulic pressure FB value when the LU slip control is being stably executed.

In the present embodiment, the given range RNGf is the predetermined threshold range such that it is determined that the lockup clutch 36 is controlled to be placed into the target slipping state, when it is determined that the actual LU slip amount Nslplur has been converged into the predetermined threshold range as the given range RNGf. Thus, the LU command pressure value Splu can be appropriately corrected by the learning.

While the preferred embodiment of this invention has been described in detail by reference to the drawings, it is to be understood that the invention may be otherwise embodied.

For example, in the above-described embodiment, the hydraulic pressure FB value at a time when the state in which the actual LU slip amount Nslplur is in the given range RNGf has lasted for at least the given time TMf was obtained as the learning value. However, this arrangement is not essential. For example, the hydraulic pressure FB value obtained as the learning value may be updated by each cycle of execution of the control routine after the above-described time as long as the above-described learning conditions are satisfied.

In the above-described embodiment, the power source is constituted by the engine 12. However, this arrangement is not essential. For example, the power source may be constituted by an electric motor in addition to or in place of the engine 12. That is, the present invention is applicable to an engine vehicle including only the engine as the power source, an electric vehicle including only the electric motor as the power source, and a hybrid electric vehicle of parallel or series type including the engine and the electric motor as the power sources.

In the above-described embodiment, the automatic transmission 22 is constituted by an automatic transmission of planetary gear type. However, this arrangement is not essential. For example, the automatic transmission 22 may be any one of other type transmissions such as a synchronous mesh twin shaft parallel axis-type automatic transmission including a known DCT (Dual Clutch Transmission). It is noted that the automatic transmission 22 does not necessarily have to be provided in the vehicle to which is the present invention is applied.

In the above-described embodiment, the fluid transmission device in the form of the torque converter 20 is provided in the power transmission device 16. However, the provision of the torque converter 20 is not essential. For example, the fluid transmission device may be constituted by, in place of the torque converter 20, by another fluid transmission device such as a fluid coupling device without a function of torque boost effect. That is, the present invention is applicable to any vehicle that is provided with (i) a power source, (ii) drive wheels and (iii) a fluid transmission device which is disposed in a power transmission path between the power source and the drive wheels and which includes a lockup clutch.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine (power source)
14: drive wheels
20: torque converter (fluid transmission device)
36: LU clutch (lockup clutch)
80: electronic control apparatus (control apparatus)
84: transmission control portion
86: LU-clutch control portion (lockup-clutch control portion)
88: learning control portion

What is claimed is:

1. A control apparatus for a vehicle that is provided with (i) a power source, (ii) drive wheels and (iii) a fluid transmission device which is disposed in a power transmission path between the power source and the drive wheels and which includes a lockup clutch that is to be placed in a released state, a slipping state or an engaged state by a fluid pressure supplied to the lockup clutch, the control apparatus comprising:
a lockup-clutch control portion configured to execute a slip control for controlling the lockup clutch to place the lockup clutch into the slipping state, by setting a command value of the fluid pressure which establishes a target value of a slip amount that corresponds to a difference between an input rotational speed and an output rotational speed of the lockup clutch,
wherein the lockup-clutch control portion is configured, when executing the slip control, to execute a feedback control for correcting the command value of the fluid pressure supplied to the lockup clutch by a correction amount such that an actual value of the slip amount becomes substantially equal to the target value of the slip amount, the control apparatus further comprising:
a learning control portion configured, when determining that the actual value has been converged into a given range with respect to the target value, to obtain the correction amount by which the command value of the fluid pressure has been corrected, and to correct the command value that is to be set for a next execution of the slip control, by learning with use of the obtained correction amount,
wherein the learning control portion is configured to set the given range, depending on the target value of the slip amount.

2. The control apparatus according to claim 1,
wherein the learning control portion is configured to set the given range such that the actual value of the slip amount is not in the given range when the actual value of the slip amount is zero.

3. The control apparatus according to claim 2,
wherein the slip amount is obtained by subtracting one of the input and output rotational speeds of the lockup clutch from the other of the input and output rotational speeds of the lockup clutch, and
wherein the learning control portion is configured to set the given range, such that the given range includes a positive-side region in which the slip amount is larger than the target value and a negative-side region in which the slip amount is smaller than the target value, and such that one of the positive-side region and the negative-side region is wider than the other of the positive-side region and the negative-side region.

4. The control apparatus according to claim 3,
wherein the learning control portion is configured to set the negative-side region narrower than the positive-side region when the target value of the slip amount is a positive value, and is configured to set the positive-side region narrower than the negative-side region when the target value of the slip amount is a negative value.

5. The control apparatus according to claim 1,
wherein the learning control portion is configured to determine that the actual value of the slip amount has been converged into the given range, when a state in which the actual value is in the given range has lasted for at least a given time.

6. The control apparatus according to claim 1,
wherein the given range is a predetermined threshold range, such that the learning control portion determines that the lockup clutch is controlled to be placed into a target slipping state that belongs to the slipping state, when determining that the actual value of the slip amount has been converged into the predetermined threshold range as the given range.

* * * * *